United States Patent
Anthony et al.

(10) Patent No.: US 9,132,578 B2
(45) Date of Patent: Sep. 15, 2015

(54) APPARATUS AND METHOD FOR SKINNING ARTICLES

(75) Inventors: John Crawford Anthony, Corning, NY (US); Douglass L Blanding, Painted Post, NY (US); Michael Jon Christenson, Corning, NY (US); Calvin Thomas Coffey, Baton Rouge, LA (US); William Albert Mammosser, Canaseraga, NY (US); Michael George Shultz, Lowman, NY (US)

(73) Assignee: Corning Incorporated, Corning, NY (US)

( * ) Notice: Subject to any disclaimer, the term of this patent is extended or adjusted under 35 U.S.C. 154(b) by 306 days.

(21) Appl. No.: 13/463,125

(22) Filed: May 3, 2012

(65) Prior Publication Data

US 2013/0136866 A1  May 30, 2013

Related U.S. Application Data

(60) Provisional application No. 61/564,395, filed on Nov. 29, 2011.

(51) Int. Cl.
| | |
|---|---|
| *B05D 1/26* | (2006.01) |
| *B29C 47/02* | (2006.01) |
| *B05C 5/02* | (2006.01) |
| *B29C 47/00* | (2006.01) |
| *B29C 47/08* | (2006.01) |
| *B28B 19/00* | (2006.01) |
| *B29C 47/88* | (2006.01) |

(52) U.S. Cl.
CPC ............ *B29C 47/027* (2013.01); *B05C 5/0208* (2013.01); *B05C 5/0241* (2013.01); *B28B 19/0038* (2013.01); *B29C 47/0004* (2013.01); *B29C 47/0028* (2013.01); *B29C 47/028* (2013.01); *B29C 47/0806* (2013.01); *B29C 47/8805* (2013.01); *B29C 47/8815* (2013.01)

(58) Field of Classification Search
CPC .................................................. B29C 47/0028
USPC .................................................. 264/629–631
See application file for complete search history.

(56) References Cited

U.S. PATENT DOCUMENTS

| 2,820,249 A | 1/1958 | Colombo | |
|---|---|---|---|
| 4,191,126 A * | 3/1980 | Reed et al. ...................... 118/50 |

(Continued)

FOREIGN PATENT DOCUMENTS

| FR | 2625941 | 7/1989 |
|---|---|---|
| FR | 2625941 A1 * | 7/1989 |
| JP | 2008-119604 | 5/2008 |

OTHER PUBLICATIONS

International Search Report and Written Opinion issued on Apr. 25, 2013 in corresponding PCT Application No. PCT/US2012/066713, filed Nov. 28, 2012.

*Primary Examiner* — Alexander Weddle
(74) *Attorney, Agent, or Firm* — John L. Haack

(57) ABSTRACT

A skinning apparatus including: a manifold having:
  a chamber, one or more channels, or both, to receive a source of flowable cement and to direct the received flowable cement to an interior skinning region or skinning chamber surrounding at least a portion of the lateral surface of a first article received in the skinning chamber, and to form a cement skin on the lateral surface of the received article;
  a source of motive force to controllably urge the received article into and through the skinning chamber; and
  a support member to receive and support the resulting skinned article.
Also disclosed is a method for skinning a ceramic article using the aforementioned skinning apparatus, as defined herein.

19 Claims, 15 Drawing Sheets

(56) References Cited

U.S. PATENT DOCUMENTS

| | | | |
|---|---|---|---|
| 4,814,029 A * | 3/1989 | Butcher | 156/89.22 |
| 6,190,152 B1 | 2/2001 | Cree | |
| 6,551,535 B2 | 4/2003 | Sander | |
| 6,926,858 B2 | 8/2005 | Cree | |
| 2002/0100994 A1 * | 8/2002 | Sander | 264/102 |
| 2009/0291252 A1 * | 11/2009 | Ohno et al. | 428/116 |
| 2010/0143215 A1 * | 6/2010 | Caze et al. | 422/198 |

* cited by examiner

APPARATUS AND METHOD FOR SKINNING ARTICLES

CROSS-REFERENCE TO RELATED APPLICATIONS

This application claims the benefit of priority under 35 U.S.C. §119 of U.S. Provisional Application Ser. No. 61/564,395, filed Nov. 29, 2011, the content of which is relied upon and incorporated herein by reference in its entirety.

The entire disclosure of any publication or patent document mentioned herein is incorporated by reference.

BACKGROUND

The disclosure relates to an apparatus and method for applying, for example, a thermally durable surface coat or "skin," such as a ceramic skin, to an article, such as a cylindrical ceramic substrate.

SUMMARY

The disclosure provides an apparatus and method for applying an axial surface layer or skin to a substrate, such as a honeycomb filter substrate.

BRIEF DESCRIPTION OF DRAWINGS

In embodiments of the disclosure.

DETAILED DESCRIPTION

Figure 1:
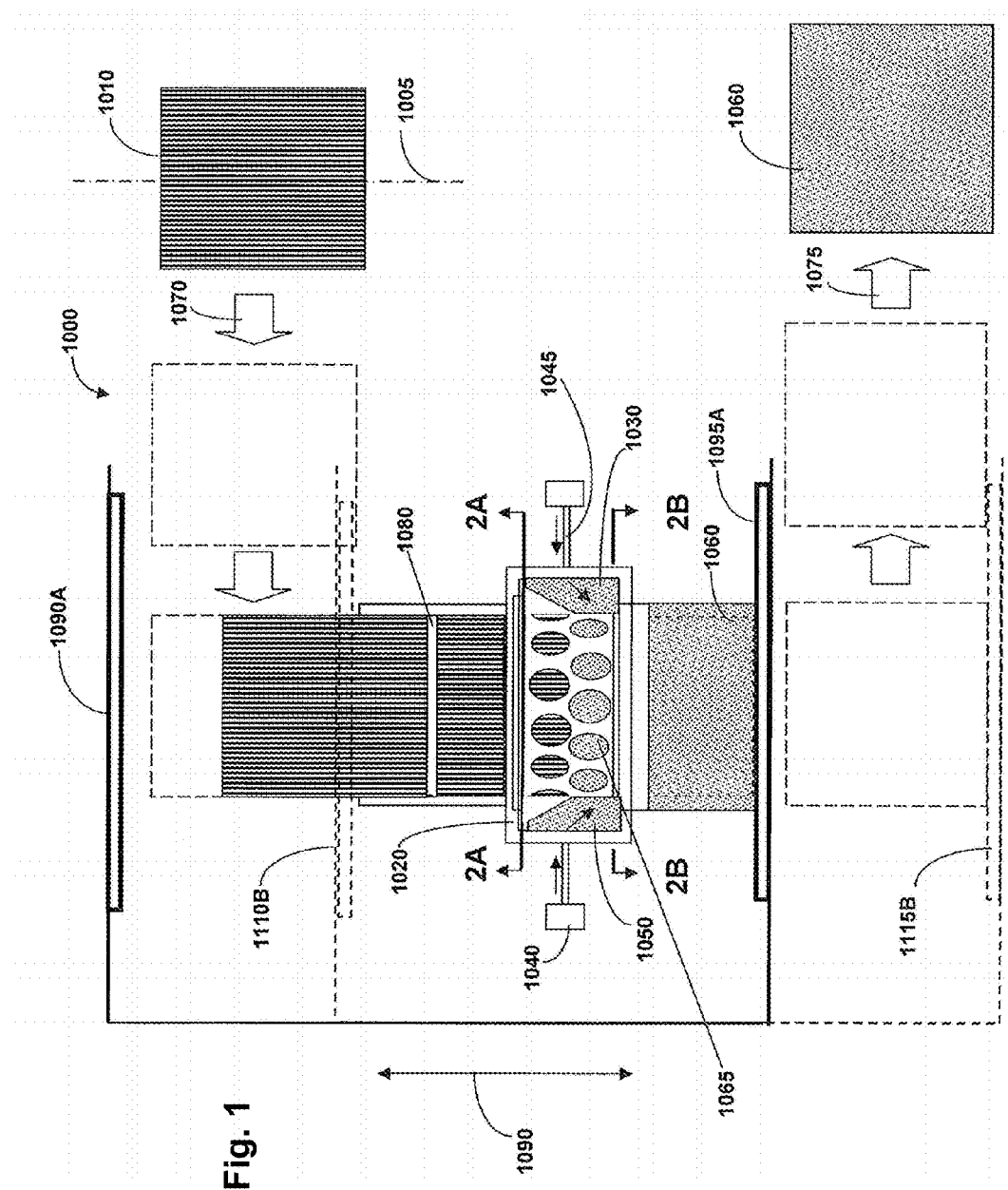
FIG. 1 shows main components of one exemplary skinning apparatus in a partial cutaway elevation cross-section view.
Figure 2:
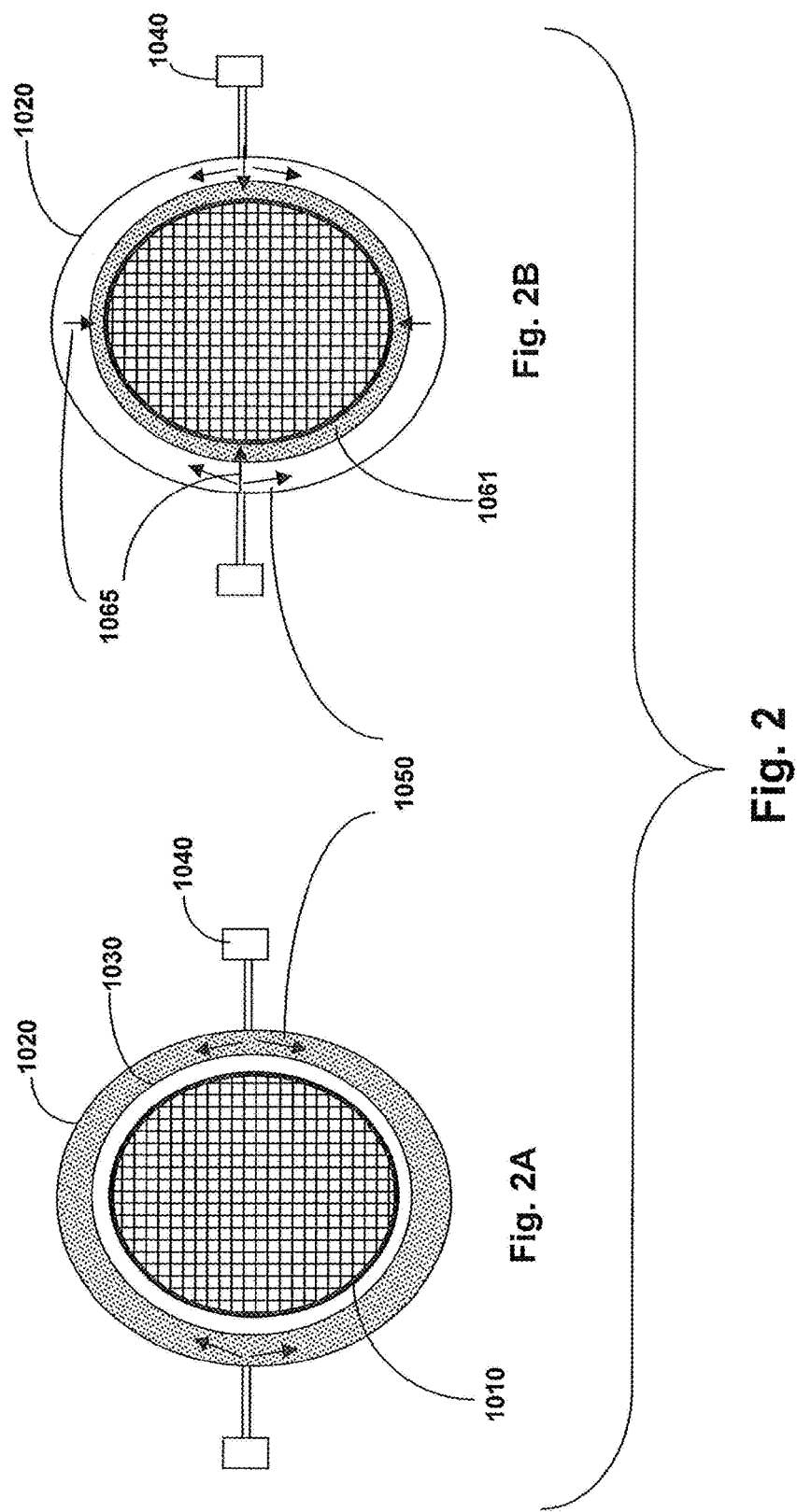
FIGS. 2A and 2B, respectively, show axial cross-section views of the skinning chamber of FIG. 1 before (2A) and after (2B) applying the skin to the article.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus, and the disclosed method of making provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Open" refers, in the context of present manifold design embodiments, to a manifold having substantially unconstrained, unrestricted, unconfined, uncontained, or like descriptors, flow of flowable cement within the manifold once received from the flowable cement source until the cement enters the skinning chamber region of the apparatus. In embodiments, there may be unintentional or undesired incidental hold-ups or stagnation of the flowable cement in the "open" manifold configuration. The "open" manifold design can be readily visualized in, for example, FIGS. 4, 5, and 6, where the flowable cement (speckled shading) can be found substantially throughout the manifold's interior chamber.

"Closed" refers, in the context of present manifold design embodiments, to a manifold having a plurality of discrete channel, tube, conduit, passage way, via, pipe, or like cement flow transport or conveyance vehicles, or combinations thereof. In embodiments, the conveyance vehicle can have a first open end to receive flowable cement from the cement source, a second open end for delivering the received cement to the skinning chamber, and a sealed (i.e., closed) middle between the first and second ends. The "closed" manifold design can be readily visualized in, for example, FIGS. 3, 7, 8, 10, 11, and 14B where the flowable cement (speckled shading) can be found flowing only within the dedicated channels found in the manifold's interior.

"Consisting essentially of" in embodiments can refer to, for example:

an apparatus for making a skinned article; and a method of making a skinned article using the disclosed apparatus.

The apparatus for making the skinned article, the method of making a skinned article, the resulting skinned article, the compositions, or the formulations, of the disclosure can include the components or steps listed in the claim, plus other components or steps that do not materially affect the basic and novel properties of the compositions, articles, apparatus, or methods of making and use of the disclosure, such as particular reactants, particular additives or ingredients, a particular agent, a particular surface modifier or wetting agent or condition, or like structure, material, or process variable selected.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The apparatus, and methods of the disclosure can include any value or any combination of the values, specific values, more specific values, and preferred values described herein.

U.S. Pat. No. 6,551,535, to Sander, entitled "Extrusion Coating Process for Catalytic Monoliths" mentions a high throughput, automated process for coating ceramic monoliths used as catalytic converters that overcome problems with coating monoliths individually in a mold. The patent also mentions that the amount of seal material pumped is controlled as a function of the monolith speed through the extrusion chamber (col. 3, lines 17-19).

Japanese Patent Publication JP2008119604A, filed Nov. 13, 2006, entitled "Method of Coating Outer Peripheral Material, Honeycomb Structure and Coater for Outer Peripheral Material," mentions a method for applying a slurry to an outer peripheral surface of a honeycomb by passing the honeycomb through an annular molding member with a predetermined inner shape.

U.S. Pat. Nos. 6,190,152 and 6,926,858, to Cree, respectively entitled "Regular Division of Molten Extrusion Flow" and "Method and Apparatus for Regular Division of Molten Extrusion Flow" mention an extrusion die design having bifurcated flow channels, which design addresses the problem of weld-lines arising from flow properties of molten polymer material in making multi-ply blown materials.

In embodiments, the disclosure provides a skinning apparatus comprising:

a manifold having a skinning chamber, the manifold receives a source of flowable cement, for example, connected to the exterior of the manifold, the manifold directs the received flowable cement to the interior skinning chamber region surrounding at least a portion of the lateral surface of a first article received in the skinning chamber, and the manifold's skinning chamber region produces a cement skin on the lateral surface of the received article;

a source of motive force (i.e., relative motion between the apparatus and the article) to controllably urge the received article into and through the skinning chamber and to optionally urge the article out of the chamber after skinning (i.e., further relative motion between the apparatus and the article); and a support member (e.g., a platen) to support and receive, or alternatively to receive and support, the resulting skinned article.

In embodiments, the manifold directs the flowable cement from the source to the skinning region and the received article at least partially positioned in the skinning chamber through a plurality of discrete channels situated circumferentially about a portion of the axial outer lateral surface of the received article.

In embodiments, the plurality of discrete channels from the source of flowable cement to the skinning chamber region and situated circumferentially about a portion of the axial outer lateral surface of the article can be bifurcated, and can comprise, for example, from about 8 to about 1,000 channels, vias, or like conduit structures, including intermediate values and ranges.

In embodiments, the manifold can direct (e.g., a via or a channel) the flowable cement from the cement source to the received article at least partially positioned in the skinning chamber to a plurality of passages situated circumferentially about the outer lateral surface of the received article.

In embodiments, the manifold can deliver the flowable cement from the cement source to the skinning chamber and the article during skinning in a consistent flow having a substantially constant pressure of, for example, from about 1 to about 10 psi, from about 2 to about 8 psi, from about 2 to about 6 psi, from about 3 to about 6 psi, from about 4 to about 6 psi, including intermediate values and ranges. The pressure applied to the source of the cement can be dependent upon and vary, for example, with the relative scale of the apparatus and article being skinned. The cement flow can be preferably free of stagnation or holdup within the manifold's chamber in an "open" configuration and more preferably in the discrete channels in a "closed" configuration. The manifold can be free of excess cement overflow before, during, or after skinning a single article or a plurality of articles.

In embodiments, the manifold directs the flowable cement, such as from a pressurized source, and preferably a constant low pressure source, to the surface of the article (work piece) and laterally (e.g., downward) to the axial outer lateral surface of the article via a first tapered wall section and an adjacent second downstream un-tapered (i.e., cylindrical) wall section. In embodiments, the pressure applied to achieve a desired cement flow can be programmably regulated to, for example, deliver the cement in a sequenced scheme including the steps or intervals including, for example, "index (the article's position or location in the manifold) and incrementally push (the article with the source of motive force)" followed by "pause (the motive force) and load (a second or subsequent article)". The aforementioned sequenced scheme can thereafter be repeated endlessly when an adequate supply of unskinned articles and flowable cement is available.

In embodiments, the support member (e.g., a platen, or plate-like horizontal surface) can be cooperatively coupled (e.g., mechanically linked or coordinated) to the source of motive force. In embodiments, the support member can be coordinately linked to the action of the motive force so that when the motive force is exerted on the axial axis (A)(1005) of the skinned article or in combination with a intermediately positioned second article, the support member yields to receive, for example, the article being skinned or having a completely skinned lateral surface. In embodiments, the source of motive force can be, for example, at least one of: a lead screw, a servo-motor driven piston, a hydraulic ram, a drive wheel, a drive roller, a bearing roller, or a combination thereof. In embodiments, the source of motive force exerts a force on the axial axis (A) of the received article. In embodiments, the flowable cement from the source of cement exerts a force on the plurality of lateral or vertical axes of the received article. In embodiments, the coordination and the application of the motive force and of the force (e.g., pressure source) driving the cement source can be achieved by off-the-self industrial control equipment.

In embodiments, the flowable cement can temporarily hold the received article in position in the skinning chamber before, during, or after skinning the article and before being discharged.

In embodiments, the skinning chamber can accommodate at least one second article adjacent to the first article, and the articles are optionally and preferably free of end-cap separators between adjacent articles. In embodiments, the apparatus can accommodate a plurality of stacked articles, such as from two (2) to about twenty (20) or more, in or near the manifold and skinning chamber.

In embodiments, the manifold chamber can have a "closed" chamber configuration including, for example, a plurality of channels for conveying the flowable cement and a plurality of apertures in the region adjacent to at least a portion of the outer lateral surface of the received article.

In embodiments, the disclosure provides a method for skinning an article using any of the above described skinning apparatuses, the method comprising:
introducing at least a portion of a first (e.g., unskinned) article into the skinning chamber's skinning region using the source of motive force;
delivering flowable cement to the chamber's skinning region and to at least a portion of the outer surface of the first article in the skinning region; and
discharging the resulting skinned article from the chamber's skinning region using the source of motive force.

In embodiments, the method can further comprise introducing with the source of motive force a second article into the manifold's skinning region and in close contact with the first article to further advance the first article through the skinning region.

In embodiments, the flowable cement delivered to the outer surface of at least a portion of the article can urge the article to move laterally or axially (e.g., downward) in the skinning chamber region and away from the source of motive force, and cause the article to further receive flowable cement and to afford further surface skinning of the article.

In embodiments, the method can further comprise sequentially introducing into the chamber's skinning region a plurality of subsequent articles, for example, stepwise, continuously, or a combination thereof.

In embodiments, the introduced plurality of articles is free of end-cap separators between adjacent articles.

In embodiments, from 1 to about 1,000 articles per minute, from 2 to about 100 articles per minute, and from 5 to about 50 articles per minute, including intermediate values and ranges, such as from 1 to about 100 articles, can be skinned using the disclosed apparatus and method.

In embodiments, the discharged first skinned article and all subsequent skinned articles, such as a honeycomb filter, can have a substantially uniform skin thickness of, for example, about 0.1 to 100 millimeters, about 1 to 50 millimeters, about 1 to 10 millimeters, and like thicknesses, including intermediate values and ranges, on the lateral surface of the article.

The discharged skinned article can have a substantially uniform surface skin thickness that has, for example, less than about 0.01 to 0.1 mm thickness variation on the lateral surface of article.

In embodiments, the method can further comprise simultaneously delivering another un-skinned article to the manifold by the source of motive force and discharging a first skinned article to the support member.

In embodiments, the method can further comprise heating, cooling, drying, post-finishing (e.g., scraping, sanding, grinding, and like operations), or a combination thereof, of the skinned article during or after the article is discharged from the manifold.

In embodiments, the method can further comprise delivering an un-skinned article to the source of motive force (e.g., in alignment with the manifold for introduction into the manifold) by a robot, and removing the skinned article from the support member by the same or a different robot.

In embodiments, the method can further comprise pre-wetting the article prior to introduction of the article into the skinning region such as with water or like aqueous formulations that can optionally include wetting agents, surfactants, or like additives, for example, to avoid or prevent the porous ceramic article from wicking or adsorbing the liquid carrier phase of the flowable cement into the article too rapidly. Such wicking or adsorption can lead to irregular or non-uniform consistency of the flowable cement deposited on the surface of the article, which inconsistencies can in turn produce irregularities or non-uniformities in the skin on the article.

In embodiments, the method can further comprise positioning the article entirely within the skinning chamber during skinning of the entire surface of the article, for example, to avoid the formation of skin artifacts or non-uniformities, such as ring indentations. In embodiments, the method can further comprise a combination of the aforementioned pre-wetting and positioning the article entirely within the skinning chamber during skinning.

The disclosed apparatus and method of making are robust and low-cost compared to other available methods.

In embodiments, "cylindrical" can include a cylinder of various tubular forms or shapes, such as a regular right cylinder (i.e., circular), a square-shaped cylinder, an oval cylinder, a triangular-shaped cylinder, an hexagonal cylinder, and like geometries, or a combination thereof, and not only regular right circular cylinders having axially symmetry. In embodiments, "lateral surface" of the article refers to the sides but not the ends of the article.

The disclosed apparatus can be operated on any commercially useful scale, for example, to accommodate articles, such as ceramic honeycomb parts used in auto or diesel exhaust gas conditioning.

Articles or parts can have, for example, diameters or outer dimensions of from about 0.1 to about 20 inches or more, from about 0.5 to about 15 inches, from about 1 to about 12 inches, and like commercially useful diameters or outer dimensions, including intermediate values and ranges.

In embodiments, the skinning apparatus and method of using can use precision shims to precisely control the width of the skinning region. However, it was found that the use of shim controls was unnecessary. In embodiments, the viscosity of the skinning cement and the rate (linear speed) at which the articles are fed through the manifold can be precisely controlled. However, it also was found that the use of precise viscosity and feed rate controls was unnecessary. In embodiments, a pressure vessel, a ram extruder, and like devices can be selected and adapted to supply the skinning cement at a constant volumetric flow rate, or preferably at a constant low pressure, to the manifold and to the surface of the article being skinned.

By controlling the pressure of the skinning cement from the cement source to the manifold, the apparatus can automatically self-regulate the consumption of skinning cement by the article being skinned.

Although not limited by theory, the self-regulating consumption of flowable skin cement may be attributable to the following phenomena. The wet skin cement coating can fill the thin skinning region space or gap between the chamber wall and the article. This arrangement can present a restriction or resistance to the flow of any additional cement into the skinning region. The restriction or resistance presents congestion to flow and provides an intrinsic, self-regulating control of the rate at which the skinning cement can be supplied to the article. If articles are pushed through the manifold's skinning region at a higher rate, then the rate of skin cement consumption increases. If the parts are pushed through the manifold's skinning region more slowly, then the consumption rate of skin cement decreases accordingly.

In embodiments, the disclosed apparatus can have two or more manifolds, such as from 2 to about 100, from 4 to about 50, and from 6 to about 20 manifolds, including intermediate values and ranges, which multiple manifolds are similarly situated, such as in series or parallel. When the apparatus has two or more manifolds the throughput of skinned articles can be dramatically increased and hardware, such as the source of motive force and the source of cement can be commonly shared to service the multiple manifolds and avoid the expense of hardware duplication.

In embodiments, the skinned articles can be removed, for example, one at a time from below the manifold immediately as the skinned articles emerge with freshly applied, wet skin. A platen can support the bottom-most skinned article from below and can then lower the part away from the manifold and deliver it to, for example, a conveyor or like transport. The supporting platen can receive the skinned articles without touching the newly applied skin on the sides of the part.

In embodiments, the skinned articles can be dried immediately after the skin is applied with any suitable means, such as a drier, heater, microwave, etc., so that the articles can be quickly and safely handled, such as engaging the sides of the newly applied skin by a pusher, drive wheels, a conveyor belt, or a robotic hand.

In embodiments, the un-skinned article can be wetted prior to being engaged in the receiving end of the manifold. This pre-wetting prevents or minimizes the porous article from drawing an excessive amount of moisture or other liquid vehicle component from the skinning cement mixture. Without pre-wetting the newly surface skin can dry too quickly. If the surface skin dries too quickly, then a higher force may be needed to push the parts through the manifold.

In embodiments, excellent skinned articles can be obtained using the disclosed apparatus and method without the need for end-caps or separator disks between articles. If the end faces of adjacent parts are kept reasonably square and flat, the relatively thick skinning cement is unable to flow into tiny gaps or the narrow separation between axially aligned adjacent parts. The end faces of the parts generally stay clean, and free of cement or other debris even without using end-caps.

Referring to the Figures, FIG. 1 shows main components of one exemplary skinning apparatus (1000) in partial sectional cutaway and illustrates process details. Un-skinned parts or articles (1010) can be delivered or fed by any suitable means, individually or in a continuous series, to the manifold (1020) which includes a skinning chamber (1030). At least one source of cement (1040) can be conveyed to the skinning chamber (1030) by one or more of any suitable conduit (1045) for any suitable direction, such as above, below, on a side, or a combination thereof. Un-skinned articles (1010) can be introduced into the skinning chamber (1030) from one direction (e.g., above) and pushed or urged through (i.e., vertically downward) the apparatus at, e.g., constant speed Skinned articles (1060) emerge from the opposite end the manifold (1020) Skinning cement (1050)(approximate flow patterns shown by arrows) can be supplied, for example, under a constant pressure into the manifold. Skinning cement can penetrate through the apertures (1065) (i.e., holes) and into the skinning chamber to contact the article (1010). Generally, the pressure of the skinning cement exerted against the part can cause the skinning cement to adhere to the outer surface of the part to form a uniformly thin skin on the article, for example, a thickness of from about 0.1 mm to about 10 mm, from about 0.2 mm to about 5 mm, and from about 0.3 mm to about 2 mm, including intermediate values and ranges.

In embodiments, the open arrows in FIG. 1 represent optional article handling (not shown) before (1070) and after (1075) the skinning apparatus, such as by robotic, mechanized, manual, or like handling and transport. In embodiments, the gap (1080) between adjacent articles (1010) is exceedingly small or non-existent and can obviate the need for O-ring seals or end-cap separators.

In embodiments, the apparatus includes a source of motive force (1090) which can provide relative motion between the source of motive force and the skinning apparatus. In embodiments, the article support (1095A) can be in cooperation with the source of motive force (1090A) in the feed-skin-support position A. The source of motive force when actuated can be advanced to position B (1110B) and have the article support (1115B) in the advance-receive-discharge position B.

In embodiments, as shown in FIGS. 1, 2, 4, 12, 13, and 15 an "open" manifold design can be selected which permits the skinning cement to flow throughout the manifold's interior chamber and then be selectively introduced into the skinning chamber, for example, through a plurality of apertures (1065), or directly through a circumferential slot (1031) without individual apertures. A shortcoming of the "open" manifold design is that certain cement flow "dead zones" may be present and can accumulate low- or no-flow cement over time and consequently change the "open" manifold interior geometry and compromise cement flow properties.

In embodiments, the "open" manifold can be constructed of, for example, a unitary structure having a hollow or the "open" interior, and an apertured member situated between the hollow chamber interior and the interior opening which receives the article. In the "open" design an O-ring can optionally be selected and reside in one or more optional grooves in the manifold, to seal the gap between the manifold and the un-skinned article to prevent leakage of the flowable cement.

FIGS. 2A and 2B show, respectively, the cross-sectional area of an "open" manifold's (1020) interior chamber (1030) before skinning the un-skinned article (1010) (un-skinned) having an axial axis (A)(1005) at section line 2A (FIG. 2A) and after skinning the article (1061) (skinned) at section line 2B (FIG. 2B). The interior chamber (1030) can be selected to be large enough so that skinning cement from the source (1040) will readily flow into and around within the manifold to substantially all points and the plurality of apertures (1065) as shown by the cement flow pattern lines (1050) within the manifold (1020) without any significant drop in pressure. Since there are no apertures in the interior skinning chamber defined by wall (1030) portion sectioned at 2A, the cement flows around the periphery of the manifold and downward toward the section having apertures (1065) as shown in the section 2B. The skinning cement then penetrates through the apertures of the manifold and into the skinning region annular space (1061) surrounding the part. The pattern of the apertures can be made (e.g., drilled) so that every area around the entire circumference of the part being skinned can be directly contacted by the skinning cement under pressure. During operation, the article or part inside the annular space (1061) of the skinning region can be pushed vertically downward (by any suitable means; not shown) at a substantially constant speed. The section of the annular space (1061) of the skinning region above the apertures (i.e., the article receiving end of the apparatus) can have an internal diameter that approximates but is slightly larger than the outer diameter of the parts to be skinned, i.e., the un-skinned article (1010). The fit of the parts in the in-put end or receiving end of the apparatus causes parts to be reasonably well centered in the interior skinning chamber (1030). The remaining section of the interior skinning chamber (1030), such as around the apertures and below, can be fabricated to have a slightly larger diameter to accommodate skin material adhering to the skinned article (1061). In embodiments, this can be referred to as the skinning section or skinning region of the skinning chamber. The pressure of the skin forming cement emerging through the apertures in the skinning section preferably promotes good adhesion of the skin cement to the article. The pressure can also cause the skin cement to flow in an axial direction in the annular space between the article and the skinning section. The flow in an "upstream" direction (e.g., upward or counter to the relative motion of articles) can be prevented by, for example: making the gap between the un-skinned article manifold too small, e.g., less than about 0.1 mm, to permit escape or leakage of the cement; or the articles are feed continuously and continuously moving (e.g., downward) and in opposition to any potential upward flow. In the downstream direction (downward), there can be flow of the skinning cement. Because the part is moving downward and the skin is adhered to the part, the skin cement on the part will be dragged downward. However, even if the part movement were stopped, there would still be some measurable viscous flow in the downward direction. For this reason, the parts preferably are fed through at a substantially constant speed to provide a substantially constant skin thickness on the surface of each article. If it is desired to slow the speed of the article(s) movement through the manifold, or to suspend the process, then it may be desirable to commensurately reduce the pressure of the skinning cement within the manifold or delivered to the manifold. If the movement or transit of articles were to stop or be temporarily interrupted, the pressure of the cement can be reduced to zero or near zero to avoid having skinning cement escape from the manifold assembly, such as the manifold's discharge end, and which escape cement is not adhered to the surface of an article and is preventable waste.

Figure 3:
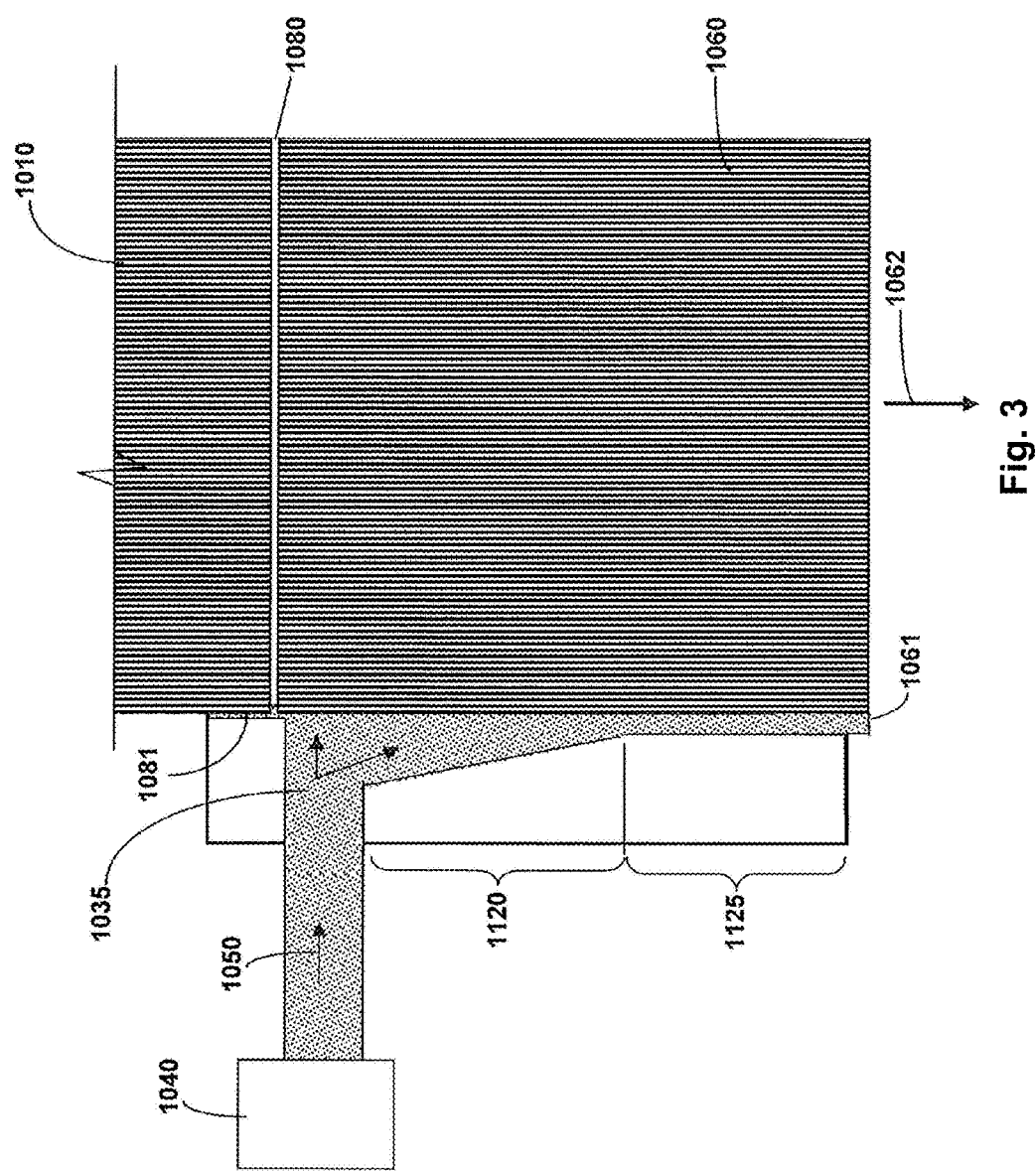
FIG. 3 shows an elevation cross-section view of the skinning region of an alternative "closed" manifold interior design.

FIG. 3 shows an elevation cross-section view of the skinning region of an alternative "closed" manifold interior channel(s) (1035) design having a cement source (1040), and having cement conduit or discrete closed channels and flow pattern (1050) to an article being skinned or having been skinned (1060) and an adjacent article waiting to be skinned (1010). The cement flow (1050) pattern to an article being skinned or having been skinned (1060) in this embodiment includes a tapered side wall region (1120) and an adjacent non-tapered sidewall region (1125) to provide the surface skin (1061). In this configuration the apparent gaps (1080, 1081) between adjacent pieces (1010, 1060) and adjacent chamber walls are sufficiently small so that no cement leakage occurs during skinning operations. The "closed" design is advantaged by providing uniform cement flow to the article surface and avoids any low flow or "dead space" issues that may be possible in the abovementioned "open" design. The skinned article, as it is skinned, can proceed in the indicated process direction (1062).

Figure 4:
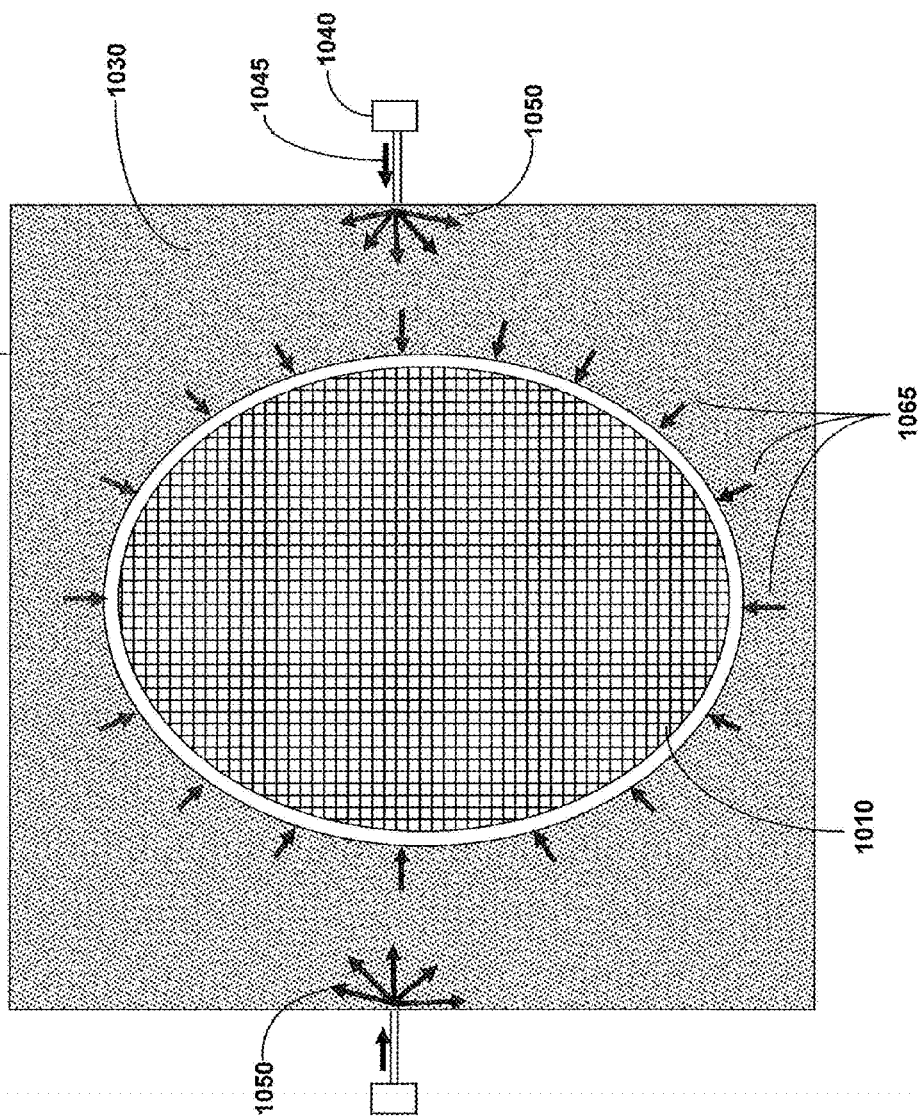
FIG. 4 shows a cross-sectional view of a skinning region of an alternative "open" manifold interior design.

FIG. 4 shows a cross-sectional view of the manifold (1020) of a skinning region of an "open" interior chamber (1030) design having a cement source (1040), a cement conduit (1045) and initial flow pattern (1050), and a plurality of apertures (1065; shown as short arrows) opening to the axial surface of a honeycomb article (1010) in the skinning region waiting to be skinned.

In embodiments, as shown in FIGS. 5, 6, 7, 8, and 9, a manifold having in part or entirely a manifold having a "closed" interior chamber or channel(s) that permits the skinning cement to only flow to the interior of the skinning chamber and to the article surface through dedicated channels. No special seal is needed between the surfaces of a two-piece "closed" manifold design where the fastened halves can butt against each other or where the skinning chamber region has narrow tolerances between the skinning chamber wall(s) and the article being skinned. Here the flowable cement viscosity can be selected to be high so as not to seep through the gap between joined halves of the manifold or where the manifold and the un-skinned article come into contact. In embodiments, the flowable cement can have a viscosity, for example, comparable to the consistency of peanut butter.

Figure 5:
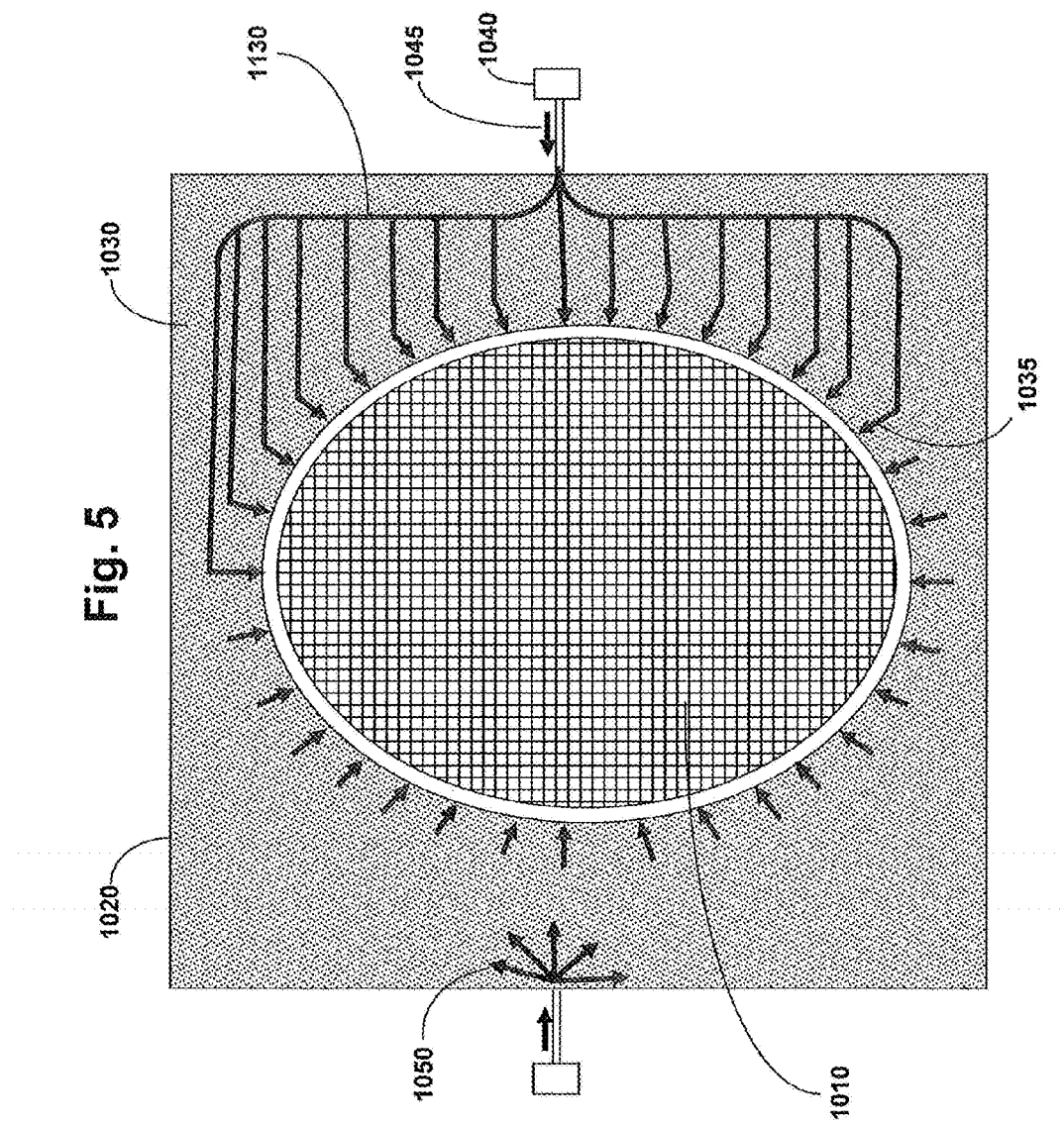
FIG. 5 shows another cross-sectional view of a skinning region of an alternative manifold interior design having both "open" (left side) and "closed" (right side; dedicated flow channels) cement flow region configurations.

FIG. 5 shows another cross-section view of a skinning region of another alternative skinning chamber design having a combination of both an "open" (left side) and "closed" (right side) skinning region configurations. Thus, the manifold (1020) has both "open" (left side) and "closed" (right side) skinning regions in the skinning chamber (1030). The "open" (left side) has an open cement flow pattern (1050) from the cement source (1040) and a plurality of apertures (short arrows) about a portion of the chamber surrounding a portion of the article to be skinned. The "closed" (right side) skinning region configuration does not have the open cement flow pattern (1050), but instead has closed and dedicated channels or lines (1130) which can deliver the cement uniformly and circumferentially to the lateral surface of the honeycomb article (1010). This embodiment and variations thereof can be used, for example, to prepare skinned articles having deliberate differential skin thickness properties, such as thicker on one side of the article and thinner on the other, or when dedicated closed cement lines (1130) are interlineated or alternated with open apertures the skinned honeycomb article (1010) once skinned can have alternating thicker and thinner skin lines on the lateral surface of the article. Differential skin thickness and thickness patterns can also be readily achieved by, for example, controlled variation of the respective cement source pressures. In embodiments, skinning chamber designs having both "open" (left side) and "closed" (right side) skinning region configurations can also advantageously be used to provide skinned articles having differential compositions on the surface of the article by, for example, providing cement from different sources, which different sources have different compositions and provide different properties when adhered to the surface of the article.

Figure 6:
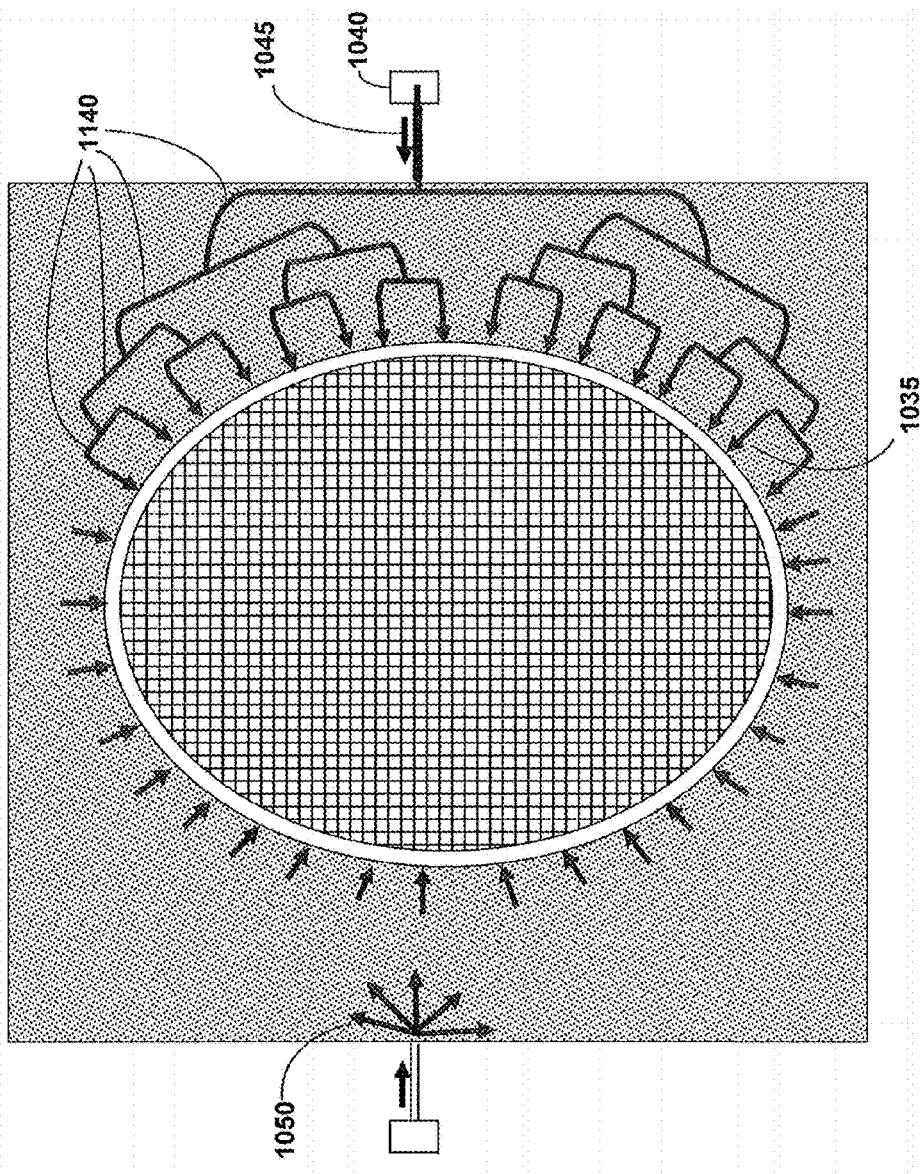
FIG. 6 shows yet another cross-sectional view of a skinning region of an alternative manifold interior design having both "open" (left side) and "closed" (right side; dedicated and bifurcated flow channels) cement flow region configurations.

FIG. 6 shows another cross-section view of a skinning region of another alternative skinning chamber design having a combination of both "open" (left side) and "closed" (right side) skinning region configurations as in FIG. 5 with the exception that the "closed" or dedicated cement flow lines consist of an expanding series of bifurcated channels (1140) leading to the article to be skinned. The bifurcated channels (1140) provide superior cement flow properties and cement distribution properties. These superior properties can provide skinned articles having superior skin properties, such as high thickness uniformity, and skins that are essentially defect free. As described for FIG. 5, the bifurcated channels (1140) can also be used in combination with open cement flow pattern (1050) to achieve desired skin thickness or composition variations.

Figure 7:
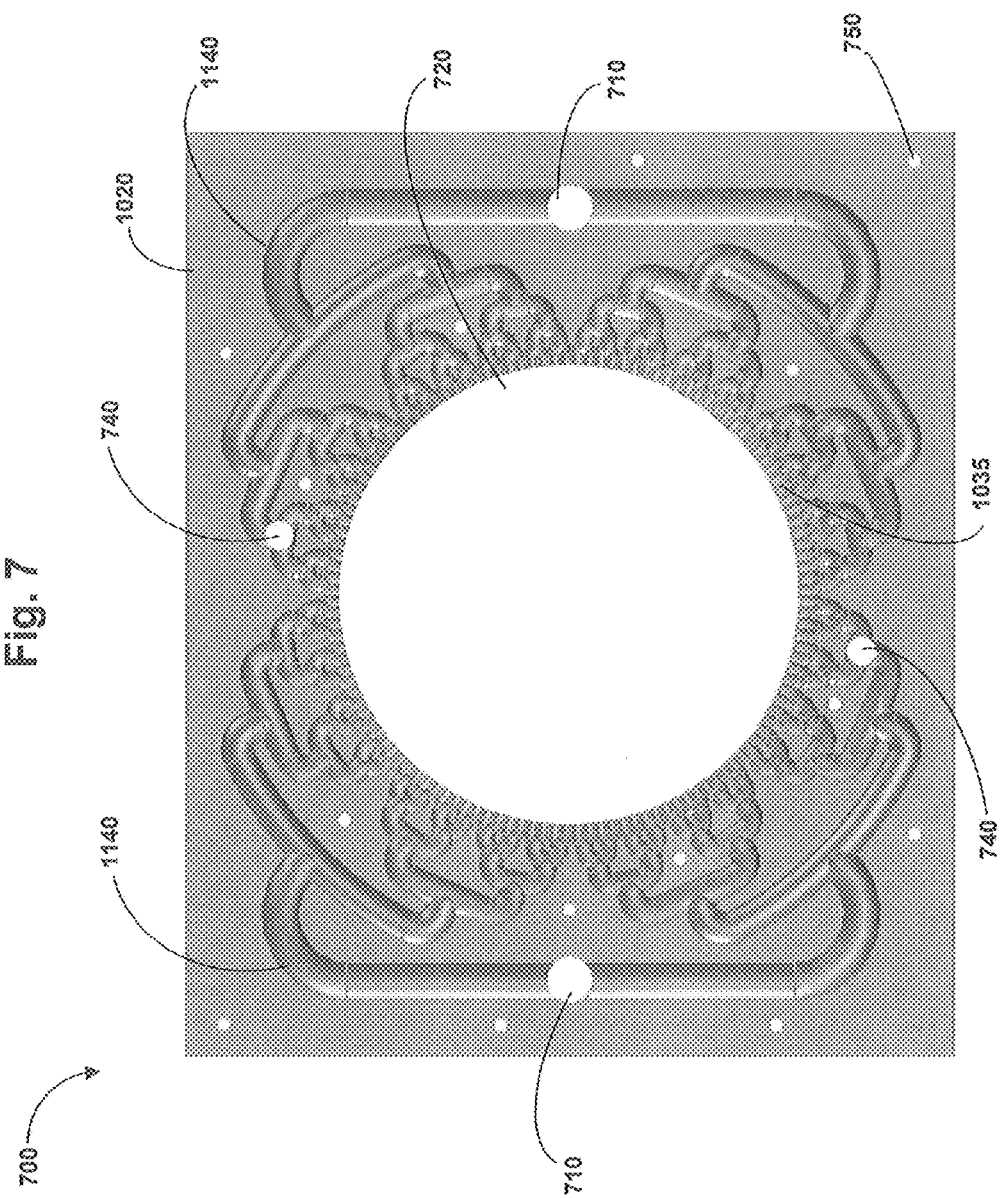
FIG. 7 shows a rendered image of yet another cross-sectional view of an alternative "closed" configuration manifold interior design having bifurcated channels.

FIG. 7 shows a rendered graphic image of yet another cross-sectional view of an alternative "closed" bifurcated skinning chamber configuration. Cement source openings (710) provide cement to the bifurcated channels (1140), which channels further bifurcate to provide a plurality of dedicated closed channels that deliver the cement to the skinning chamber annulus (720) where the article (not shown) to be skinned resides. The manifold (1020) having a plurality of closed bifurcated channels (1140) can optionally include, for example, one or more sensor ports (740) to monitor, for example, flow, temperature, viscosity, moisture, and like process condition metrics, and optional fastener holes (750) for joining the sectioned half with an opposing half section. The manifold (1020) having a plurality of closed bifurcated channels (1140) can be made by machining the bifurcated channels (1140) into a suitable first sheet, such as a performance or engineering plastic, a metal, a composite, and like materials, or combinations thereof. A second opposing sheet can be machined having the identical mirror image of the bifurcated channels (1140) of the first sheet and then the sheets joined together. Alternatively, the second sheet can be un-machined and then joined with the first sheet. In embodiments, the "closed" manifold, such as illustrated in FIG. 7, can be constructed from, for example, two halves (one half shown) having dedicated cement flow channels machined into one or both of the halves. The two halves of the manifold can be fastened together and attached to the source of cement. In embodiments, the two halves can be clamped together, for example with, a pair of worm-drive type hose clamps. This two-piece construction permits convenient disassembly for cleaning and reassembly.

Figure 8:
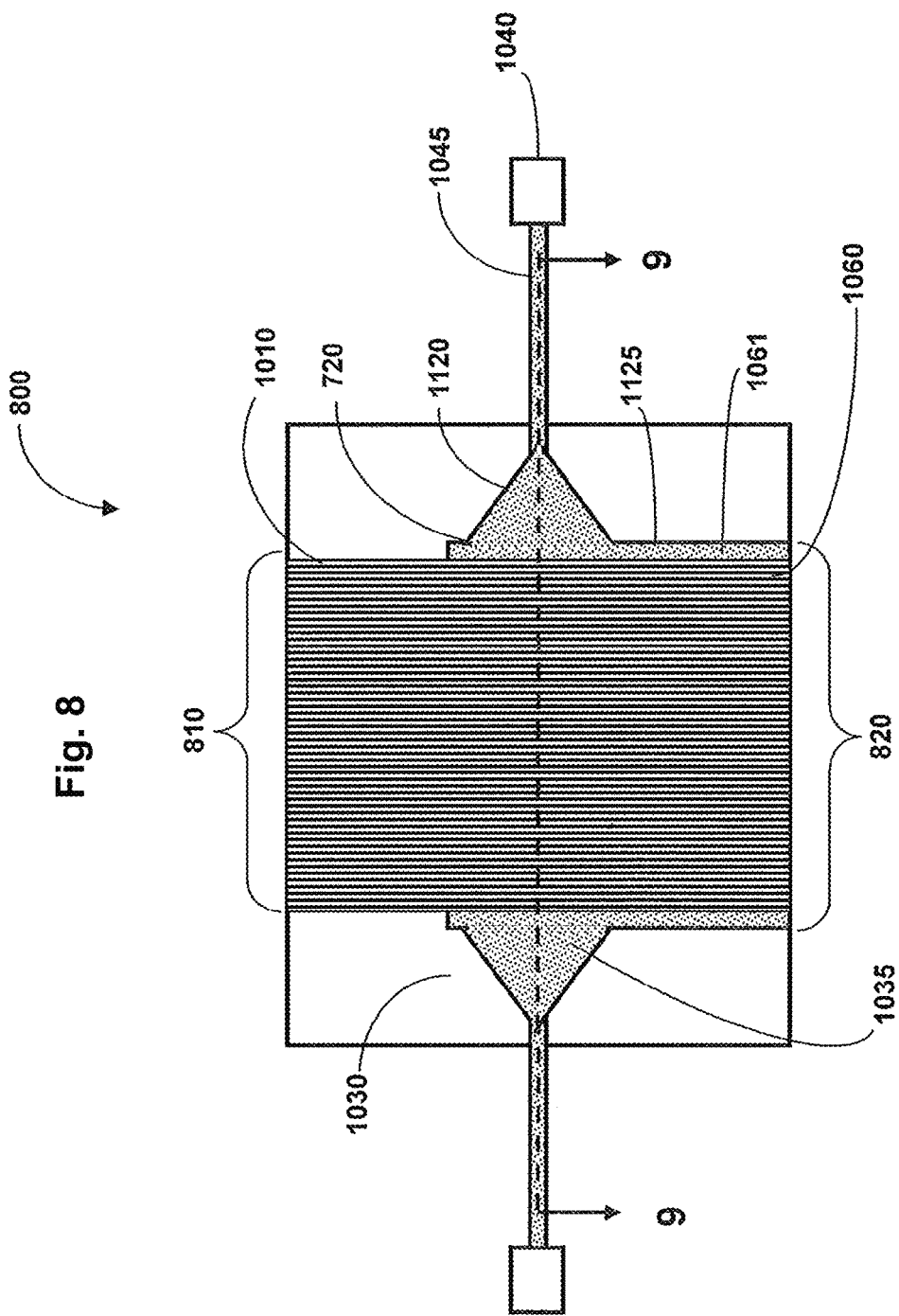
FIG. 8 shows an elevation sectional view of the manifold design of FIG. 7 having a "closed" manifold interior configuration.

FIG. 8 shows an elevation sectional view of a manifold (800) having a "closed" skinning chamber (1030) configuration. Un-skinned article (1010), having for example, a square-shaped honeycomb cross-section, can be introduced to the manifold at opening (810) having a dimension just slightly larger than the dimensions of the square-shaped article (1010). The article (1060) when fully skinned (1061), i.e., with cement adhered to the surface of the article, can be discharged from the manifold at opening (820) having dimensions the same or just slightly larger than the dimensions of the skinned article (1060). The difference between the dimensions between the manifold opening (820) and the lateral wall of the article can determine the thickness of the resulting surface skin. The skinning chamber region or annulus (720) where the transiently un-skinned article (1010) and partially skinned article (1060) resides can be skinned with cement from at least one cement source (1040) having cement conduit (1045) to a plurality of dedicated and bifurcated channels leading to the skinning chamber annulus (720). Each bifurcated channel can flare or expand its diameter as the channel approaches the skinning annulus region to provide, for example, a bell shaped conduit and aperture (1120) where the cement can flow into the skinning annulus region (720) with slightly reduced pressure compared to the pressure in the channels upstream and providing at least one of the aforementioned tapered cement flow regions in proximity to the article. The tapered portion (1120) of the skinning annulus region (720) preferably transitions into a non-tapered region (1125).

Figure 9:
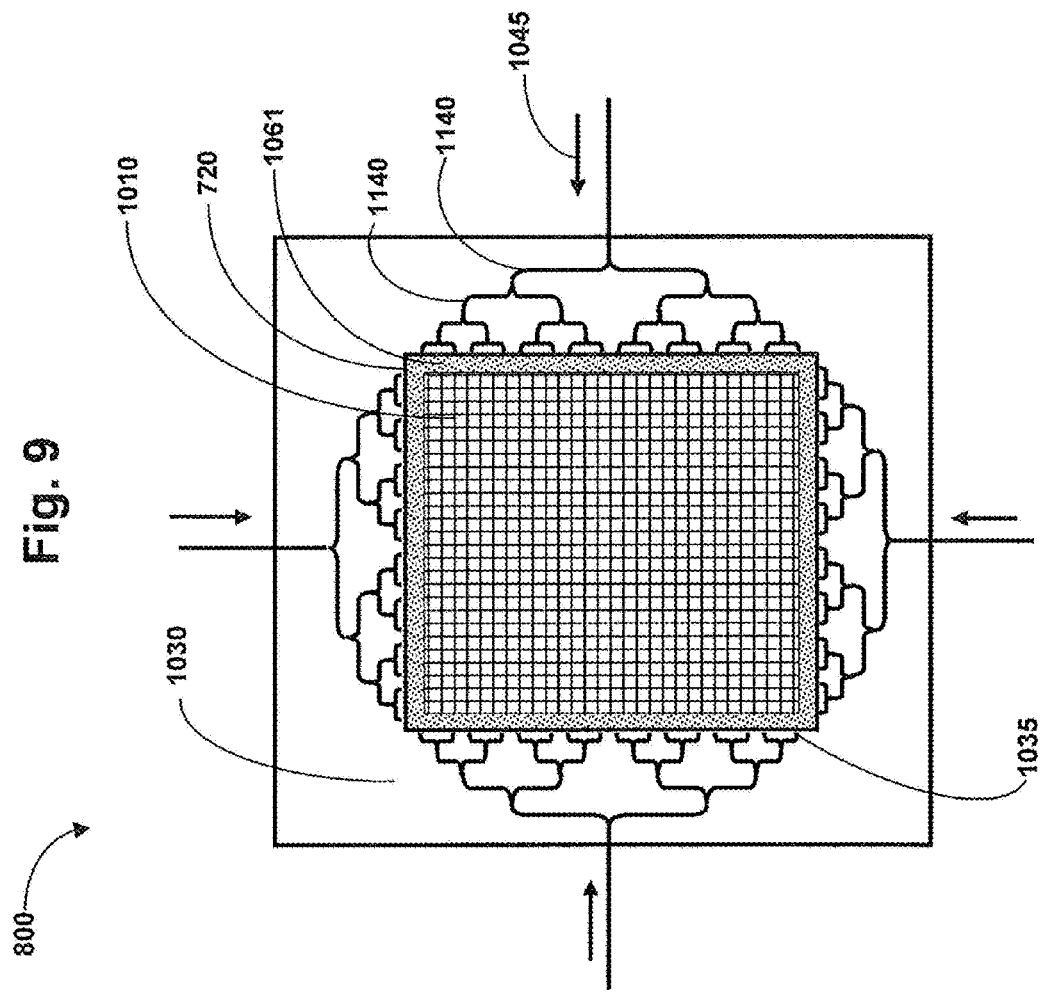
FIG. 9 shows a cross-sectional view of the manifold, such as in FIG. 8, having the "closed" skinning configuration for skinning articles having non-circular geometries.

FIG. 9 shows a cross-sectional view of the manifold (800) of FIG. 8 which has only the "closed" manifold interior (1030) configuration for skinning articles having non-circular geometries, such as square or rectangular monolith. Reiterating, the un-skinned article (1010), having for example, a square-shaped honeycomb cross-section, can be introduced to the interior cavity of the skinning chamber (720). Cement flow (1045) from the cement source can enter the manifold at one or more channel locations and each channel can be further bifurcated one or more times into one or more terminal bifurcated channels (1140), which terminal bifurcations ultimately result in apertures that deliver the flowable cement to the skinning chamber region (720) to provide cement to the surface of the article to form the skin on the article (1061).

Figure 10:
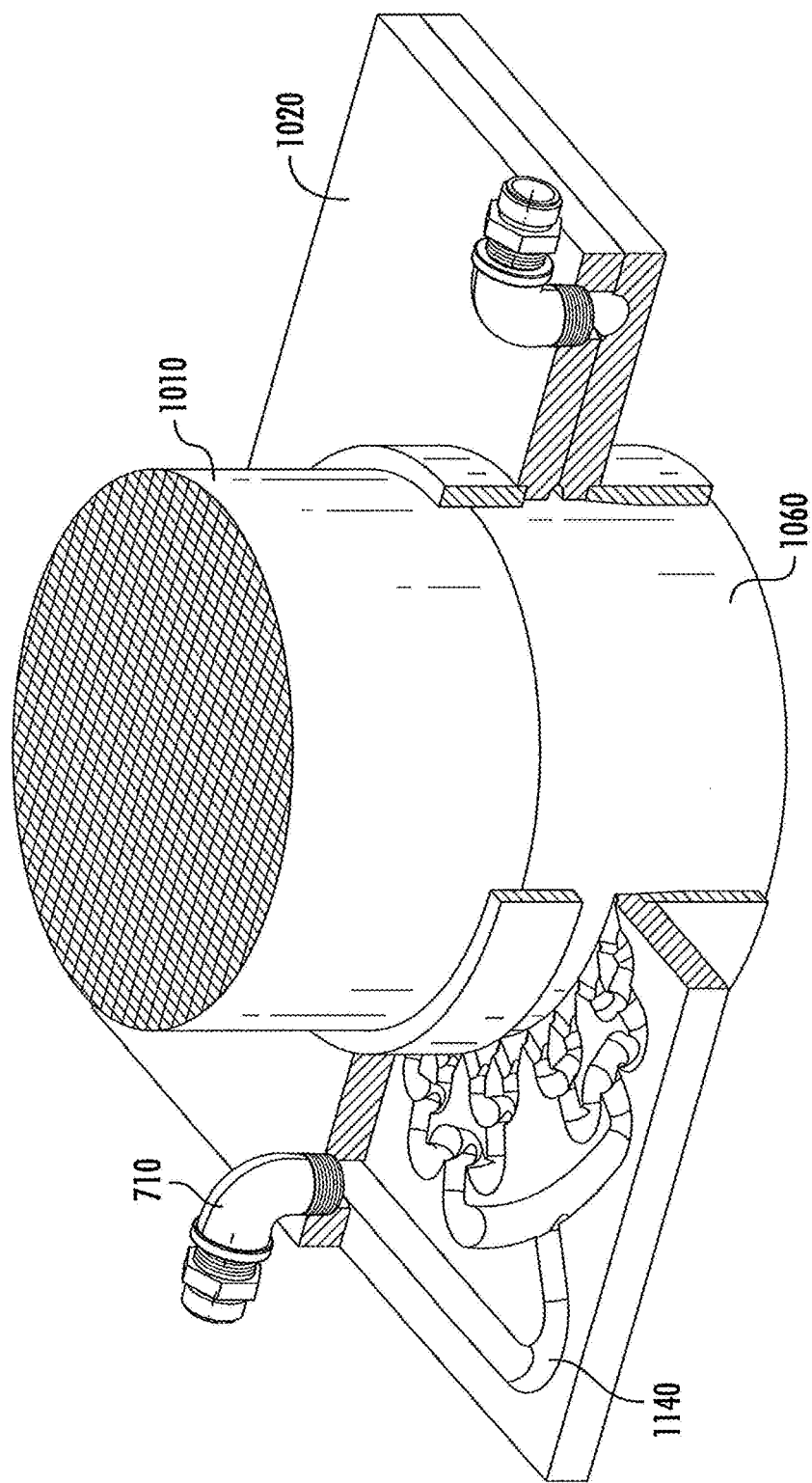
FIG. 10 shows a perspective view of the manifold of FIG. 7 in partial cut-away (left front quarter) and full cut-away (right front quarter), having the "closed" skinning configuration and having an article in the skinning region.

FIG. 10 shows a perspective view of the manifold (1020) of FIG. 7 in partial cut-away (left front top quarter) and full cut-away (right front top and bottom quarter), having the "closed" skinning configuration and having an article in the skinning region. As described for FIG. 7, cement source openings (710) provide flowable cement from the source to the bifurcated channels (1140), which channels can be further bifurcated to provide a plurality of dedicated closed channels that deliver the cement to the skinning chamber where the article or articles, such as a honeycomb ceramic article, waiting to be skinned (1010) and being skinned (1060) reside. Cement is omitted here for a clear view of the plumbing.

Figure 11:
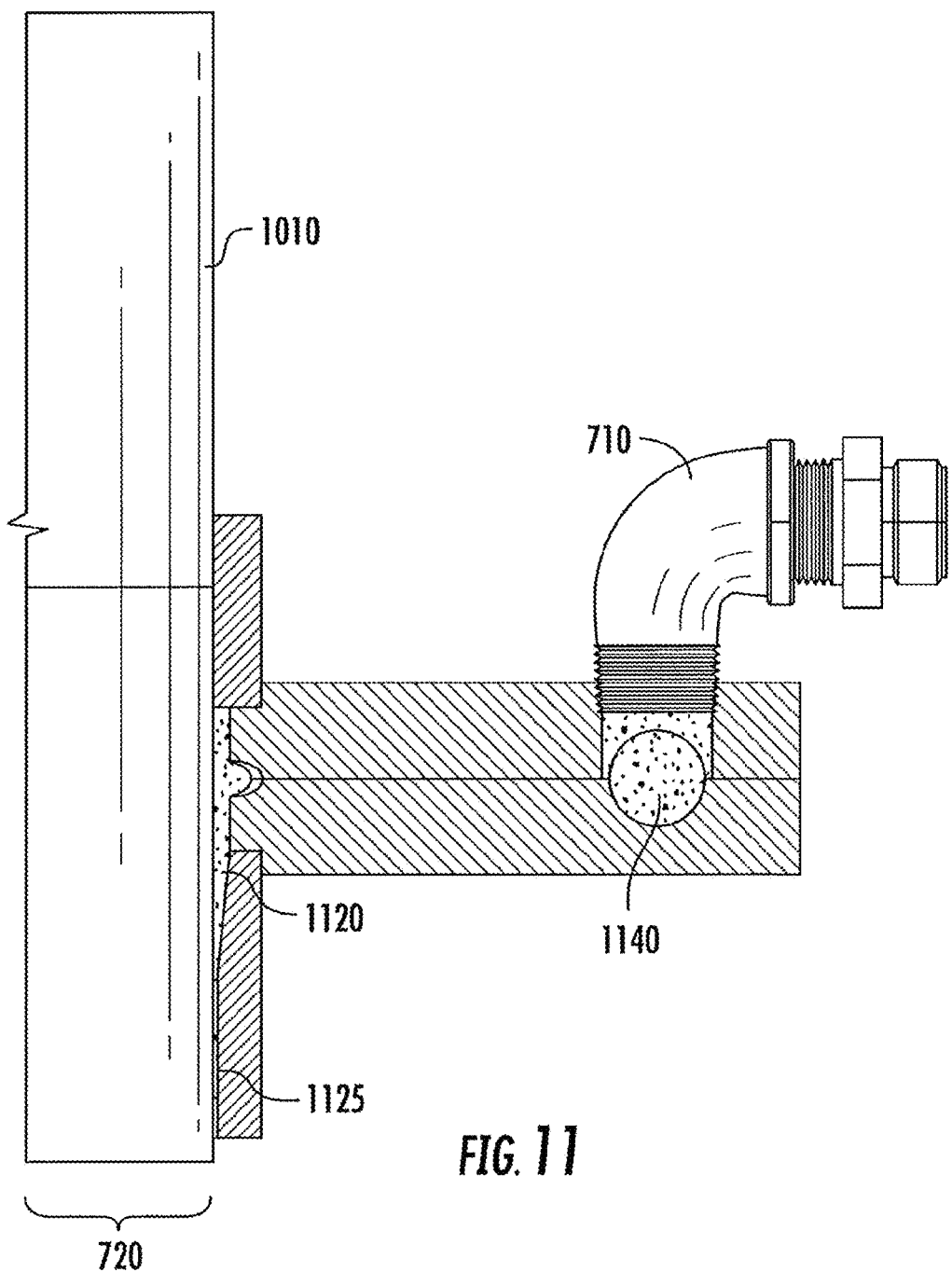
FIG. 11 shows a cross-sectioned elevation view of the right side of the manifold of FIG. 10.

FIG. 11 shows a cross-sectioned elevation view of the right side of the manifold of FIG. 10 where the cement source opening (710) provides cement to the bifurcated channel(s) (1140), which channel(s) can be further bifurcated one or more times, to provide a plurality of dedicated closed channels that deliver the cement to the skinning chamber (720) where the article or articles waiting to be skinned (1010) and being skinned (1060) reside. Cement is shown here as the dark shaded regions. As alluded to in FIG. 8, each channel, bifurcated channel, closed channel, or like configuration, can optionally flare or have an expanded internal diameter as the channel approaches the skinning region to provide, for example, a conduit or aperture having any of a downwardly tapered region (1120; shown), an upwardly tapered region (not shown), or both (not shown), where the cement can flow into the skinning annulus region (720), for example, with a slight pressure reduction compared to the pressure in the channels upstream and providing at least one of the aforementioned tapered cement flow regions in proximity to the article. The tapered portion (1120) of the skinning annulus region (720) preferably transitions into a non-tapered region (1125).

Figure 12:
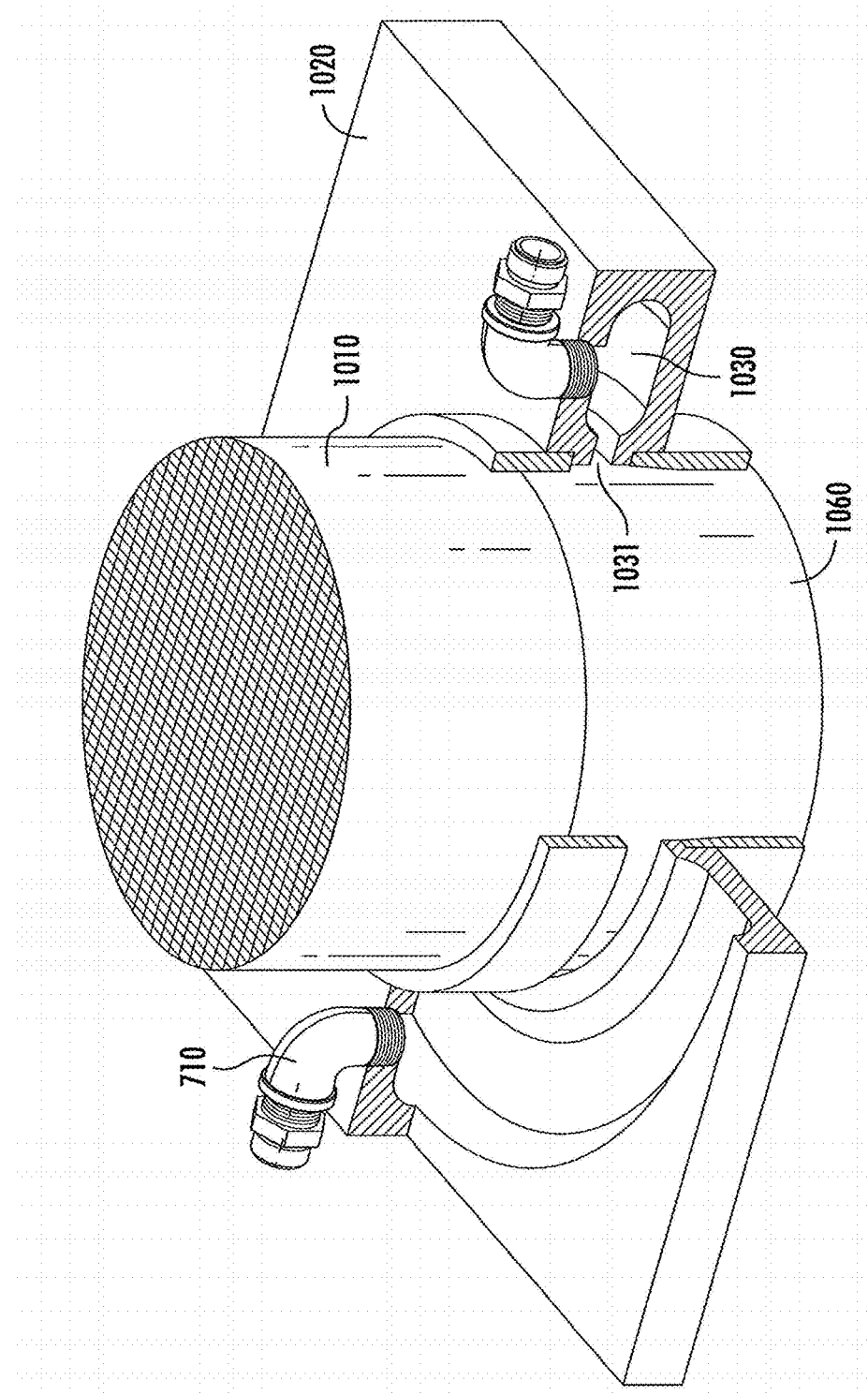
FIG. 12 shows a perspective view of a manifold in partial cut-away (left front quarter) and full cut-away (right front quarter), having the "open" skinning configuration and having an article in the skinning region.

FIG. 12 shows a perspective view of a manifold in partial cut-away (left front quarter) and full cut-away (right front quarter), having the "open" skinning chamber (1020) configuration and having an article in the skinning region. Cement source openings (710) provide flowable cement from the source to the open interior of the manifold (1030), which open interior can directly deliver the cement to the skinning chamber through a continuous annulus or opening where the article or articles, waiting to be skinned (1010) and being skinned (1060) reside. Cement is omitted here for a clear view of the plumbing.

Figure 13:
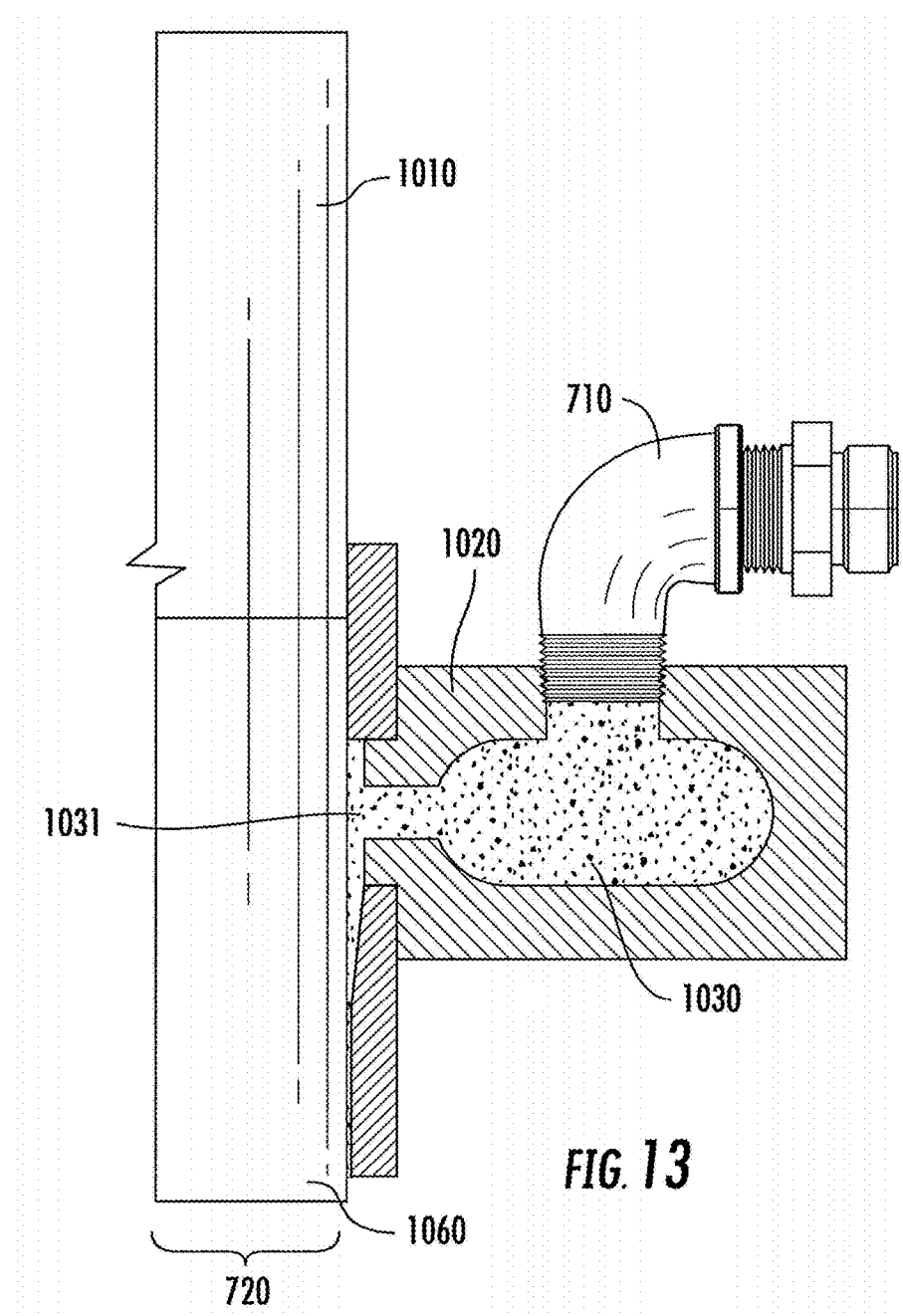
FIG. 13 shows a cross-section elevation view of the right side of the manifold of FIG. 12.

FIG. 13 shows a cross-section elevation view of the right side of the manifold (1020) of FIG. 12 where the cement source opening (710) provides cement to the open interior of the manifold (1030). The manifold's open interior can directly deliver the cement to the skinning chamber (720)

through a continuous annulus or opening where the article or articles, waiting to be skinned (1010) and being skinned (1060) reside. Cement is shown here as the dark shaded regions. In embodiments, the skinning chamber (720) region can optionally or preferably have a tapered portion (1120) where the skinning annulus transitions into a non-tapered region (1125).

Figure 14A:
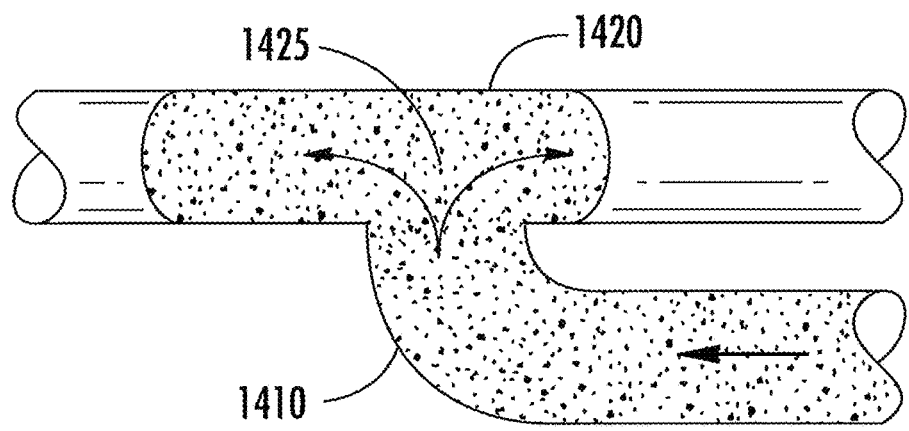
FIGS. 14A and 14B, respectively, show a closed channel design having less than excellent flow properties (14A) and a related closed channel design having improved and excellent flow properties (14B).
Figure 14B:
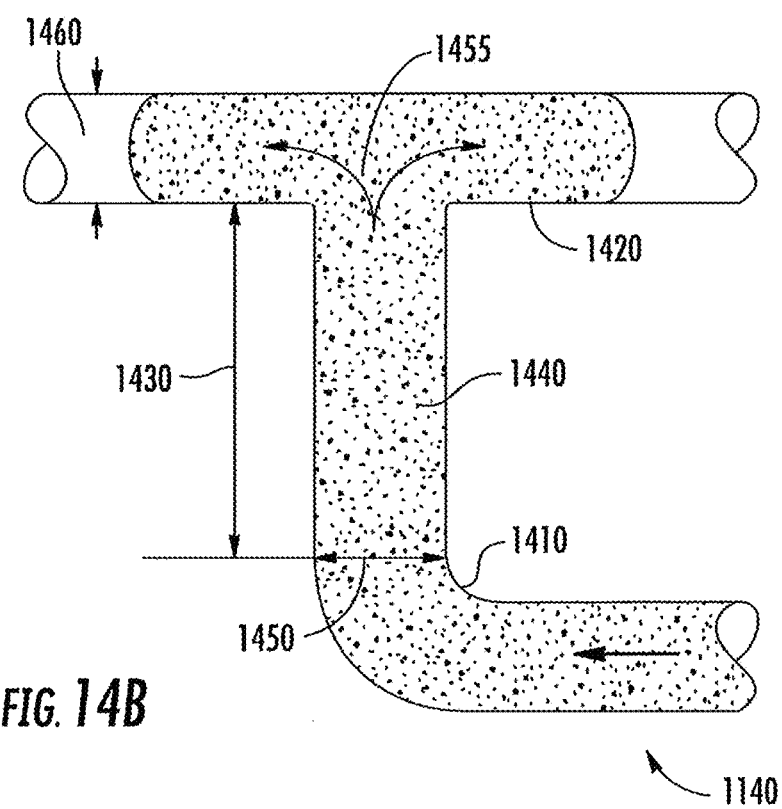

FIGS. 14A and 14B, respectively, show a closed channel design (14A) having less than excellent cement flow properties, and a related closed channel design (14B) having improved and excellent uniform cement flow properties. The bifurcated channels (1140) generally preferably have a uniform cement flow and a uniform flow front (1455). A uniform flow front provides, for example, a nearly equal split or division of the bulk flowable cement (1455) when the cement flow encounters, for example, a "T", a "Y", or similar fork or like cement flow dividing member, junction, or channel geometry. As shown in FIG. 14A, when an inbound elbow (1410) is situated to closely to a flow divider (1420) or there are dissymmetric flow angles at the divide, there can result an unequal division of the cement flow (1425). This phenomena, when taken over a series of bifurcations, can collectively and ultimately result in an unequal or irregular cement flow and cement distribution within the skinning chamber and about the article being skinned leading to, for example, non-uniform skin thicknesses or incomplete skin coverage on the article(s). To avoid complications or negative consequences associated with the aforementioned irregular cement flow and distribution in the skinning chamber, the channel length (L) (1430) and channel diameter (D1)(1450) (see 14B) between the elbow (1410) and "T" (1420) of the bifurcated channel (1140) can be, for example, lengthened, extended, straightened, widened, narrowed, and like reconfigurations, or combinations thereof, to provide a channel section (1440) which can provide an approximately even or equal division (1455) of the divided cement flow in the respective arms of the divided channel (1420), and can provide uniform cement flow and uniform cement distribution in the skinning chamber (photographic comparison not shown). In embodiments, a preferred channel length (L)(1430) can be, for example, greater than or equal to either or both of the channel diameters (D1 and D2)(1450 and 1460, respectively), such that L≥D1≥D2.

Figure 15:
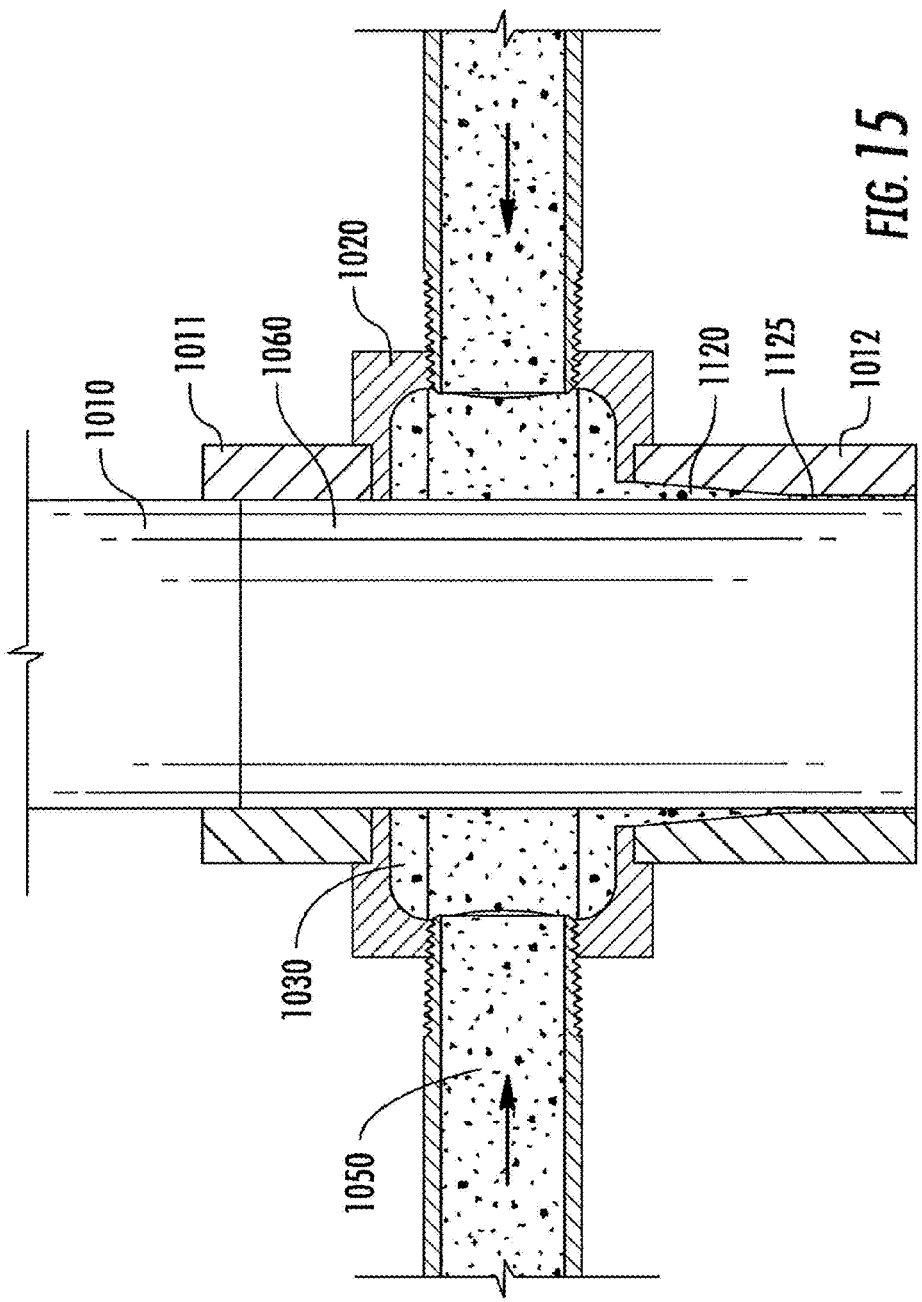
FIG. 15 shows an elevation cross-section view of the skinning region of an alternative "open" interior manifold design.

FIG. 15 shows an elevation cross-section view of the skinning region of an alternative "open" manifold interior design. The manifold (1020) has a hollow or "open" interior (1030). Like the "open" manifold of FIGS. 1 and 2, there can be an un-skinned article (1010) (un-skinned) waiting to be skinned adjacent or atop the article being skinned (1060), and a cement flow (1050)(speckled shading) from the flowable cement source to the manifold's interior chamber (1030). Unlike the "open" manifold of FIGS. 1 and 2, the interior chamber (1030) of FIG. 15 does not include an interior wall having apertures (1065) that separates the interior chamber (1030) from the article being skinned (1060). Like the "closed" manifold of FIG. 3, the skinning region can include a tapered region (1120) and a non-tapered region (1125). The tapered region (1120) and a non-tapered region (1125) can partially or completely surround the article being skinned. FIG. 15 additionally shows a receiver guide pipe (1011) that can receive the articles to be skinned, and an exit guide pipe (1012) that can temporarily hold and guide the skinned article away from the manifold. Here both the tapered region (1120) and a non-tapered region (1125) can be accommodated by the interior diameter(s) structure of the receiver guide pipe (1011).

In embodiments, one method of making skinned articles with the disclosed apparatus can be summarized as including, for example, one or more of the following positional stages:

In a first stage an un-skinned article is placed in the "LOAD" position where the source of motive force (SMF), for example, a ram at the top of its stroke, allows sufficient space for manual or robotic placement of the un-skinned part to be skinned in the "LOAD" position.

The SMF (e.g., a ram) then moves into the "READY" position where the SMF is in contact with the top of the first loaded article. A platen beneath the manifold moves up into a ready position to support the lower end of the article from below. Optionally, a second article can be loaded into the manifold atop the first loaded article. The upward force of the platen keeps the abutting ends of the stacked first and second articles pushed together creating an effective end seal.

In a third "SKINNING" step flowable cement is uniformly discharged from the source to the manifold and then onto the walls of the article to achieve the skinning. At the beginning of the "SKINNING" step, pressure can be applied to the cement source, such as with a pressurized air tank or compressor. The tank can optionally be stirred, agitated, vibrated, or like manipulations, to facilitate uniform flow and promote texture consistency of the cement flowing out of the source to the manifold. After a short delay to allow time for the pressure to build up in the manifold, the carriage to which both the ram and platen can be attached or cooperatively coupled can be driven downward. This pushes the stack of two adjacent parts downward through the skinning chamber. The distance driven can be selected or programmed to be exactly equal in length to one article (e.g., 6 inches, 20 inches, etc.). Just before reaching the end of stroke, the pressure inside the tank can be released. This allows time for the pressure in the manifold to drop.

In a fourth "UNLOAD" step, the support platen is lowered, allowing the just skinned article to be manually or robotically taken away. When lowered, the platen no longer supports the weight of the upper second article. The second article's center section is still in the manifold. In the situation of a 2-inch diameter article, the viscosity of the skinning cement is preferably sufficiently high to prevent the upper second article from falling downward. However, in the situation of a 12-inch diameter article, it may be necessary to provide additional support to the skinned article to prevent the upper second article from falling downward.

Although not limited by theory, two different modes of operation can be envisaged. One mode, called "index-push", articles or parts can be pushed through the manifold from above with a periodic start-and-stop motion. However, to prevent skinning cement from escaping from the manifold (e.g., such as the bottom of the discharging end of the manifold), in a condition such as unattached to an article, the pressure of the skinning cement in the manifold can be held constant or reduced to zero. A second article can then be loaded (e.g., above) to have one of its end abut the end of the first article. To begin skinning the first (e.g., lower) article: the pressure of the skinning cement can be set to an operating value, for example, 1 to 30 pound per square inch (psi); and a pair of articles can be advanced (e.g., pushed downward) at a fixed velocity, for example, 1 inch per second (ips).

When a pair of articles has been advanced (e.g., pushed downward) by the length equivalent to about the length of one article, the paired articles can be stopped and the pressure can again be reduced to zero. The first (e.g., bottom) article can be supported on, for example, a platen, which provides enough force (e.g., vertically) to ensure that the gap between the abutted or paired parts remain close and closed, for example, to prevent penetration of cement from the manifold in between the paired articles. The platen can then lower the first skinned article to completely separate the part from the manifold's skinning region of the apparatus. The separated skinned first article can optionally be dried to remove moisture or solvent from the skin, such as with a microwave, and optionally cooled to permit further processing or handling. The separated skinned first article can optionally be placed on, for example, a conveyor for further processing, such as remote drying, finishing, packaging, and like unit operations. The second un-skinned article now occupies the position previously occupied by the first article in the skinning region just prior to and during skinning. The viscosity of the skinning cement prevents the now unsupported second part from moving out of the skinning region, for example, falling downward or misaligning from concentricity of the part and the interior of the manifold. The viscosity of the flowable skinning cement can be adjusted with, for example, the addition of a suitable amount of a diluent or a fugitive thickener. The flowable cement can be, for example, a cordierite slurry. A third un-skinned article can be advanced to abut the second article in the skinning position and the foregoing advancing sequence can be repeated, for example, continuously, semi-continuously, or batch-wise.

In a second mode, the articles to be skinned can be positioned end-to-end, for example, in a vertical column, with the bottom most article in the skinning section of the manifold. The column of articles can be advanced vertically downward at a constant rate (e.g., 1 ips) and the pressure of the skinning cement can be maintained at a constant value (e.g., 10 psi). As skinned articles exit from the manifold they can be supported from below by, for example, a platen, which can support the article's weight and also provide an additional upward force to ensure that the potential gap between adjacent articles in the skinning region remains closed. Once the exited skinned article is clear of the manifold, the platen can lower the skinned part and place it on a conveyor or other movement means such as mentioned above for further processing.

In embodiments, the articles can have end-caps for temporary sealing of the ends of the adjacent articles. However, such end-caps are unnecessary for successful operations providing high quality and high yield of skinned articles. In embodiments, the apparatus and method does not need to provide end-caps to protect the ends of the part at anytime during the skinning process because of the juxtaposition or close proximity of the parts being situated end-to-end. In embodiments, the apparatus and method can avoid the need to remove end-caps from the ends of the skinned parts because the end-caps can be eliminated in the first instance.

The disclosure has been described with reference to various specific embodiments and techniques. However, it should be understood that many variations and modifications are possible while remaining within the scope of the disclosure.

What is claimed is:

1. A skinning apparatus comprising:
   a manifold having an interior skinning chamber region,
   the manifold receives a source of flowable cement,
   the manifold directs the received flowable cement to the interior skinning chamber region surrounding at least a portion of the outer lateral surface of a first ceramic honeycomb article received in the interior skinning chamber region, the interior skinning chamber region having a first tapered wall section and an adjacent second downstream un-tapered wall section, and
   the interior skinning chamber region produces a cement skin on the entire lateral surface of the received ceramic honeycomb article;
   a source of motive force to controllably urge the received first ceramic honeycomb article into and through the interior skinning chamber; and
   a support member to receive and support the resulting skinned ceramic honeycomb article,
   wherein the interior skinning chamber region directs the flowable cement from the manifold to the outer lateral surface of the received first ceramic honeycomb article via the first tapered wall section and the adjacent second downstream un-tapered wall section.

2. The skinning apparatus of claim 1 wherein the manifold directs the flowable cement from the source of flowable cement to the interior skinning chamber region and the received first ceramic honeycomb article at least partially positioned in the interior skinning chamber region through a plurality of discrete channels situated circumferentially about a portion of the axial outer lateral surface of the first ceramic honeycomb article.

3. The skinning apparatus of claim 2 wherein the plurality of discrete channels are situated in the same plane and circumferentially about a portion of the axial outer lateral surface of the received first ceramic honeycomb article, are bifurcated, and comprise from about 8 to about 1,000 channels.

4. The skinning apparatus of claim 1 wherein the manifold delivers the cement from the source to the interior skinning chamber region and the received first ceramic honeycomb article during skinning in a uniform flow having a substantially constant pressure of from about 1 to about 10 psi, the cement flow is free of stagnation within the manifold, and the interior skinning chamber region is free of excess cement overflow during skinning.

5. The skinning apparatus of claim 1 wherein the support member is coupled cooperatively to the source of motive force.

6. The skinning apparatus of claim 1 wherein the source of motive force comprises at least one of: a lead screw, a servo-motor driven piston, a hydraulic ram, a drive wheel, a drive roller, a bearing roller, or a combination thereof, and the source of motive force exerts a force on the received ceramic honeycomb article.

7. The skinning apparatus of claim 1 wherein the flowable cement temporarily holds the received ceramic honeycomb article in position in the interior skinning chamber region before and after skinning, and before being discharged.

8. The skinning apparatus of claim 1 further comprising a second ceramic honeycomb article adjacent to the first ceramic honeycomb article in the interior skinning chamber region, and the first and second ceramic honeycomb articles are free of end-cap separators between the adjacent ceramic honeycomb articles.

9. The skinning apparatus of claim 1 wherein the manifold comprises a cement distribution chamber having an open interior and having one of:
   a wall having a plurality of apertures or a continuous circumferential opening, between the open interior and the interior skinning chamber region adjacent to at least a portion of the outer lateral surface of the received ceramic honeycomb article.

10. A method for skinning a ceramic honeycomb article using the skinning apparatus of claim 1, comprising:
    introducing at least a portion of a first ceramic honeycomb article into the interior skinning chamber region;
    delivering flowable cement from the source of flowable cement to the interior skinning chamber region and to at least a portion of the outer surface of the first ceramic honeycomb article; and discharging the resulting entirely skinned ceramic honeycomb article from the interior skinning chamber region using the source of motive force.

11. The method of claim 10 further comprising introducing a second ceramic honeycomb article into the interior skinning chamber region and in close contact with the first ceramic honeycomb article using the source of motive force to further advance the first ceramic honeycomb article through the interior skinning chamber region or discharge the first ceramic honeycomb article from the interior skinning chamber region.

12. The method of claim 11 further comprising sequentially introducing into the interior skinning chamber region a plurality of subsequent ceramic honeycomb articles stepwise, continuously, or a combination thereof.

13. The method of claim 12 wherein any of the introduced ceramic honeycomb articles are free of end-cap separators between adjacent ceramic honeycomb articles.

14. The method of claim 10 wherein from 1 to about 100 ceramic honeycomb articles per minute are skinned.

15. The method of claim 10 wherein the discharged first skinned ceramic honeycomb article has a substantially uniform skin thickness of from about 0.1 to 10 millimeters and has a skin thickness variation on the lateral surface of article of about 0.01 to 0.1 mm.

16. The method of claim 10 further comprising simultaneously delivering an un-skinned ceramic honeycomb article to the manifold by the source of motive force and discharging a skinned ceramic honeycomb article to the support member.

17. The method of claim 10 further comprising heating, cooling, drying, post-finishing, or a combination thereof, the discharged skinned ceramic honeycomb article.

18. The method of claim 10 further comprising delivering an un-skinned article to the source of motive force by a robot and removing the skinned ceramic honeycomb article from the support member by a robot.

19. The method of claim 10 further comprising at least one of:
pre-wetting the ceramic honeycomb article prior to introduction of the article into the interior skinning chamber region;
positioning the ceramic honeycomb article entirely within the interior skinning chamber region during skinning of the entire lateral surface of the article;
or a combination thereof.

* * * * *